(12) United States Patent
Bui et al.

(10) Patent No.: US 9,361,928 B2
(45) Date of Patent: *Jun. 7, 2016

(54) DYNAMICALLY CONTROLLING TAPE VELOCITY

(71) Applicant: INTERNATIONAL BUSINESS MACHINES CORPORATION, Armonk, NY (US)

(72) Inventors: Nhan X. Bui, Tucson, AZ (US); Kevin B. Judd, Tucson, AZ (US); Roger J. Justo, Tucson, AZ (US); Hirokazu Nakayama, Fujisawa (JP); Tomoko Taketomi, Yamato (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/960,954

(22) Filed: Dec. 7, 2015

(65) Prior Publication Data

US 2016/0086629 A1    Mar. 24, 2016

Related U.S. Application Data

(63) Continuation of application No. 14/505,706, filed on Oct. 3, 2014, which is a continuation of application No. 13/596,876, filed on Aug. 28, 2012, now Pat. No. 8,902,531.

(51) Int. Cl.
| | |
|---|---|
| G11B 15/52 | (2006.01) |
| G11B 15/06 | (2006.01) |
| G11B 5/584 | (2006.01) |
| G11B 15/46 | (2006.01) |
| G11B 15/20 | (2006.01) |

(52) U.S. Cl.
CPC ............... *G11B 15/06* (2013.01); *G11B 5/584* (2013.01); *G11B 15/46* (2013.01); *G11B 15/52* (2013.01); *G11B 15/20* (2013.01)

(58) Field of Classification Search
None
See application file for complete search history.

(56) References Cited

U.S. PATENT DOCUMENTS

| | | | |
|---|---|---|---|
| 6,717,759 B1 | 4/2004 | Himle et al. | |
| 7,023,651 B1 | 4/2006 | Peterson | |
| 7,760,455 B2 | 7/2010 | Kang et al. | |
| 8,902,531 B2* | 12/2014 | Bui | G11B 15/46 360/134 |
| 2002/0191321 A1 | 12/2002 | Anderson | |
| 2003/0016466 A1 | 1/2003 | Bui et al. | |
| 2004/0021024 A1 | 2/2004 | Yoshimura et al. | |

(Continued)

FOREIGN PATENT DOCUMENTS

| | | |
|---|---|---|
| CN | 101114462 A | 1/2008 |
| EP | 584936 A2 | 2/1994 |

(Continued)

OTHER PUBLICATIONS

RD455104, A, Mar. 10, 2002, Int Business Machines Corp [IBMC].

(Continued)

*Primary Examiner* — Brian Butcher
(74) *Attorney, Agent, or Firm* — Griffiths & Seaton PLLC

(57) ABSTRACT

A maximum velocity is dynamically determined during a tape drive operation to obtain a statistical standard deviation of a position error signal (PES) that yields an amount of stopwrite (SW) operations that avoids backhitching. The tape velocity is adjusted to the maximum velocity.

21 Claims, 7 Drawing Sheets

(56) References Cited

U.S. PATENT DOCUMENTS

| | | |
|---|---|---|
| 2005/0152058 A1 | 7/2005 | Schmidt |
| 2008/0024904 A1 | 1/2008 | Cherubini et al. |
| 2009/0279201 A1 | 11/2009 | Cherubini et al. |
| 2010/0202078 A1 | 8/2010 | Sato |
| 2010/0214690 A1 | 8/2010 | Eleftheriou et al. |
| 2010/0246043 A1 | 9/2010 | Barsotti et al. |
| 2011/0007418 A1 | 1/2011 | Bui et al. |
| 2012/0147496 A1 | 6/2012 | Cherubini et al. |
| 2015/0243317 A1* | 8/2015 | Bui .................. G11B 15/46 360/73.05 |

FOREIGN PATENT DOCUMENTS

| | | |
|---|---|---|
| EP | 1211683 A2 | 6/2002 |
| WO | 0025313 A1 | 5/2000 |

OTHER PUBLICATIONS

Lantz, et al., "Nanoscale Track-follow Performance for Flexible Tape Media," 2011.

Jia, "Write Fault Protection Against Shock Disturbance in Hard Disk Drives without a Shock Sensor," Sep. 2007.

\* cited by examiner

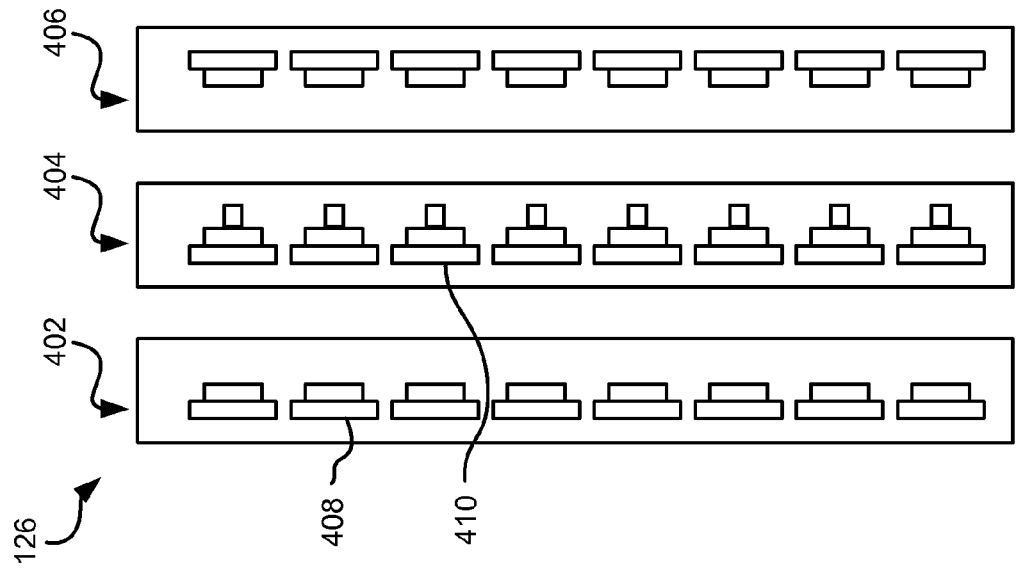
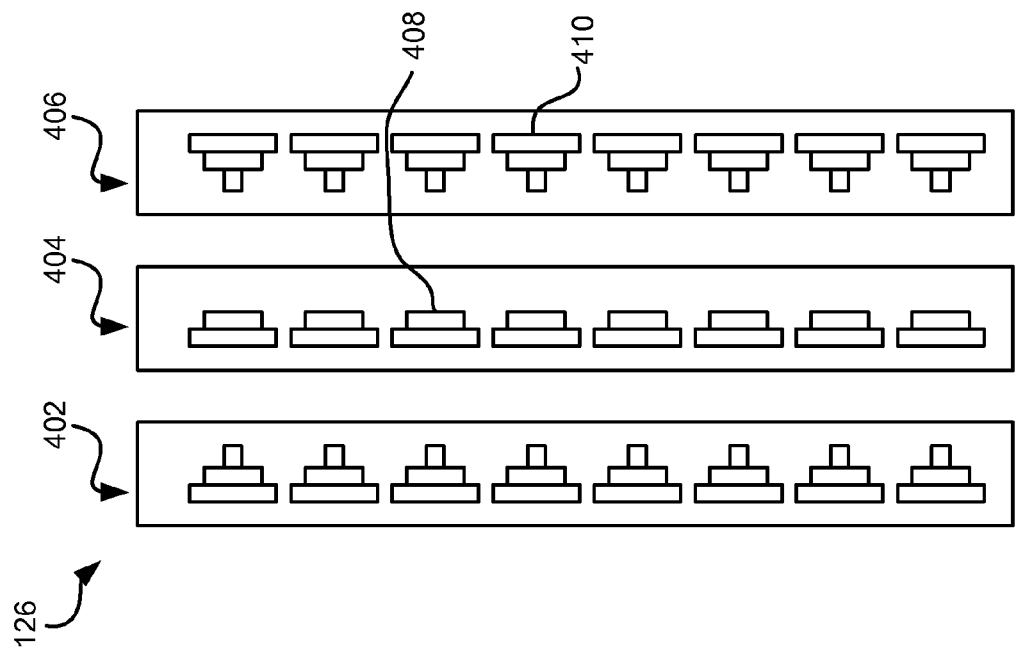

DYNAMICALLY CONTROLLING TAPE VELOCITY

CROSS-REFERENCE TO RELATED APPLICATIONS

This Application is a Continuation of U.S. patent application Ser. No. 14/505,706, filed Oct. 3, 2014, which is a Continuation of U.S. patent application Ser. No. 13/596,876, filed Aug. 28, 2012, now U.S. Pat. No. 8,902,531, the contents of both are incorporated herein by reference.

FIELD OF THE INVENTION

The present invention relates in general to computers, and more particularly to dynamically controlling tape velocity for minimizing position error signal (PES) and maximizing tape cartridge capacity.

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives and tape drives. Tape, such as magnetic tape, provides for physically storing data which may be archived or which may be stored in storage shelves of automated data storage libraries, and accessed when required.

SUMMARY OF THE DESCRIBED EMBODIMENTS

In one embodiment, a method is provided for controlling tape velocity. A maximum velocity is dynamically determined during a tape drive operation to obtain a statistical standard deviation of a position error signal (PES) that yields an amount of stopwrite (SW) operations that avoids backhitching. The tape velocity is adjusted to the maximum velocity until the statistical standard deviation of the PES is calculated.

In another embodiment, a computer system is provided for controlling tape velocity. The computer system includes a computer-readable medium and a processor in operable communication with the computer-readable medium. The processor dynamically determines a maximum velocity during a tape drive operation to obtain a statistical standard deviation of a position error signal (PES) that yields an amount of stopwrite (SW) operations that avoids backhitching. The tape velocity is adjusted to the maximum velocity until the statistical standard deviation of the PES is calculated.

In a further embodiment, a computer program product is provided for controlling tape velocity. The computer-readable storage medium has computer-readable program code portions stored thereon. The computer-readable program code portions include a first executable portion that dynamically determines a maximum velocity during a tape drive operation to obtain a statistical standard deviation of a position error signal (PES) that yields an amount of stopwrite (SW) operations that avoids backhitching. The tape velocity is adjusted to the maximum velocity until the statistical standard deviation of the PES is calculated.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 3 is a partial tape bearing surface view of a magnetic head having a write-read-write configuration;

FIG. 4 is a partial tape bearing surface view of a magnetic head having a read-write-read configuration;

DETAILED DESCRIPTION OF THE DRAWINGS

Figure 1:
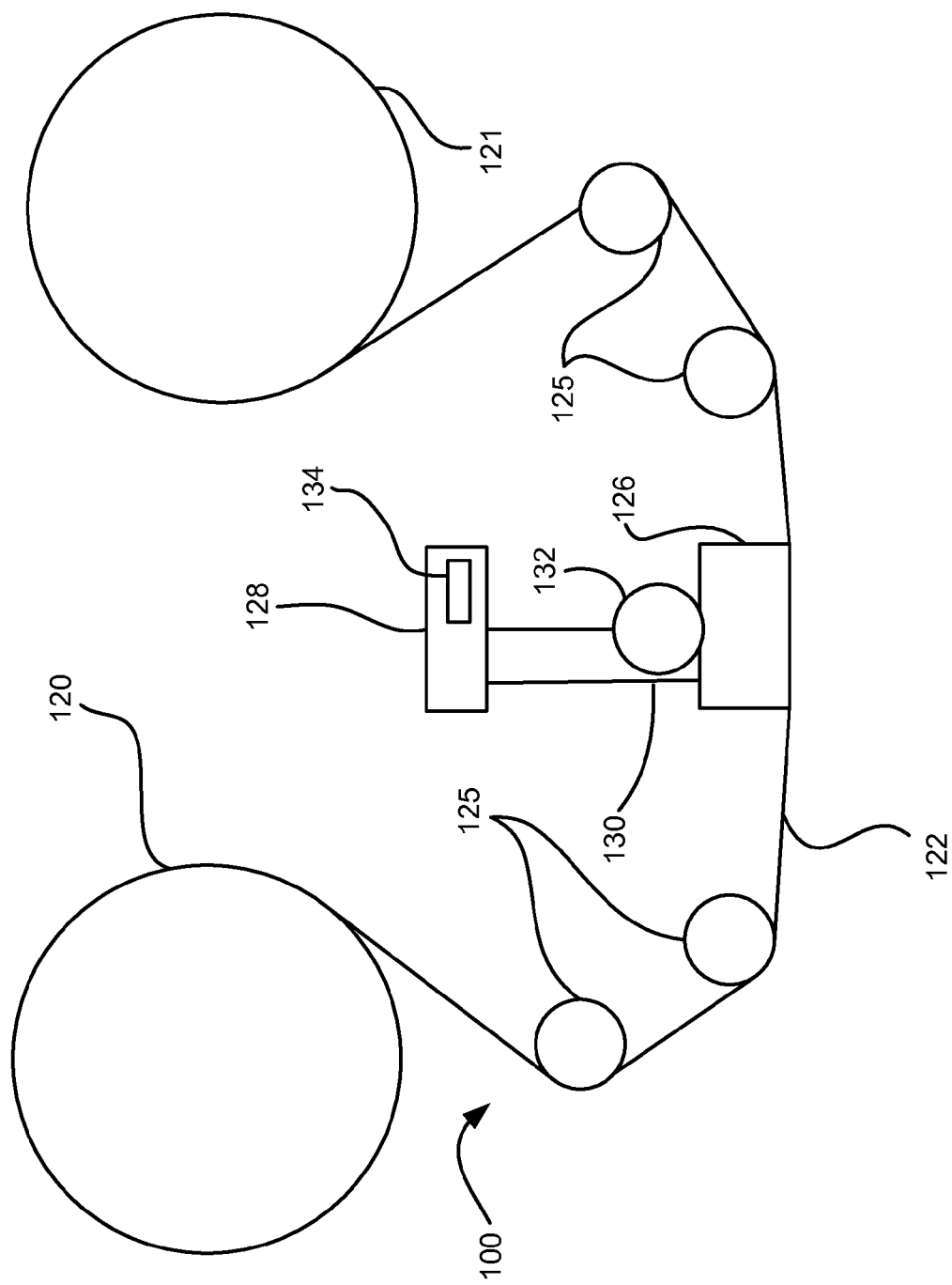
FIG. 1 is a block diagram of an exemplary embodiment of tape drive system in which aspects of the present invention may be realized.

With increasing demand for faster, more powerful and more efficient ways to store information, optimization of storage technologies is becoming a key challenge, particularly in tape drives. In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media. An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. Usually the tape head is designed to minimize the spacing between the head and the tape. The spacing between the magnetic head and the magnetic tape is crucial so that the recording gaps of the transducers, which are the source of the magnetic recording flux, are in near contact with the tape to effect writing sharp transitions, and so that the read element is in near contact with the tape to provide effective coupling of the magnetic field from the tape to the read element.

Tape drives have conventionally used a servo system to keep the write/read heads in the correct lateral location on the tape. The difference between the correct location and actual location of the heads is referred to as position error signal (PES). Current servo systems implement a fixed threshold such that if the PES is larger than the threshold, the writing of the heads will be stopped to prevent overwriting of adjacent tracks. This threshold is referred to as the stopwrite (SW) threshold. However, it is difficult to pick the appropriate SW threshold due to the differences in distributions of PES data for different drives and/or different tapes. Another drawback is that when a particular predetermined SW threshold is used, the drive may write the data without any apparent error, when actually the adjacent tracks have been overwritten, rendering the data therein unreadable. This result is highly undesirable.

If the PES exceeds the SW threshold limit, then it has been determined that the tape head is too far off-track and that to continue writing would overwrite adjacent tracks. Sometimes in a tape drive system, either the drive or the media, may have defects that increase the PES to higher levels than is usually seen. This can be due to media damage, drive damage, media debris contaminating the drive, etc. If the PES is over the SW limit for a significant amount of time, then the drive must stop writing, and reposition the tape such that writing can begin again. This significantly slows down the operation of the tape drive as it has to backhitch to reposition the media, and is also potentially damaging to the media, as a smooth streaming operation has to stop to backhitch and reposition the media.

If a tape's velocity/speed is excessive for the particular type of application being performed, a "backhitch" will occur because a new read or write command will not be received while the tape at the head is within the inter-block gaps (IBG). During a backhitch, the tape is brought to a stop downstream of the overrun IBG, then driven in a reverse direction and caused to come to rest at a point upstream of the IBG. The tape will remain stationary until a read or write instruction is received; whereupon it must accelerate as that IBG passes the read or write head, so that the tape will be at proper speed as it passes the head. In other words, a backhitch operation is a series of the following operations: reducing the traveling speed of the tape to temporarily stop the tape; moving the tape in the reverse direction; thereafter moving the tape in the forward direction again to reach a position to which subsequent data should be written; and finally writing the subsequent data to that position. The writing of the subsequent data cannot be performed before this backhitch is completed. Since a backhitch requires approximately two to three seconds, influence of the backhitch on performance of the tape drive is significant. Excessive backhitching reduces the performance of the magnetic tape drive by reducing the transfer of data and wears both the magnetic tape drive and the magnetic tape data storage media. Thus a need exists for avoiding and reducing the backhitching behavior.

In contrast, and to address this need, in one embodiment, the present invention seeks to dynamically determine a maximum tape velocity during a tape drive operation to obtain a statistical standard deviation of a position error signal (PES) that yields an amount of stopwrite (SW) operations that avoids backhitching and then adjusting the tape velocity to the maximum velocity. The statistical standard deviation of the PES can be measured as the drive is writing, and if the statistical standard deviation of the PES is too high then the drive will also have significant number of SW events. However, the standard deviation of PES can be affected by tape speed/tape velocity. Performing at a slower tape speed/tape velocity tends to decrease the standard deviation of PES. While the lower tape speed/tape velocity also implies a lower data rate and the standard deviation may then be sufficiently low to avoid backhitching behavior. The net effect will be an increase in data rate. Moreover, the maximum tape velocity that obtains the statistical standard deviation of the position error signal (PES) that yields an amount of stopwrite (SW) operations will be less damaging to the tape, as backhitching will be avoided.

FIG. 1 is a block diagram of an exemplary embodiment of tape drive system 100 in which aspects of the present invention may be realized. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller assembly 128 via a cable 130. The controller 128 typically controls head functions such as servo following, writing, reading, etc. The controller may operate under logic known in the art, as well as any logic disclosed herein. More specifically, at least one processor device (not shown) may be in communication with the logic and each individual component to control the tape drive system 100. The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive and a host (integral or external) to send and receive the data and for controlling the operation of the tape drive and communicating the status of the tape drive to the host, all as will be understood by those of skill in the art.

Figure 2:
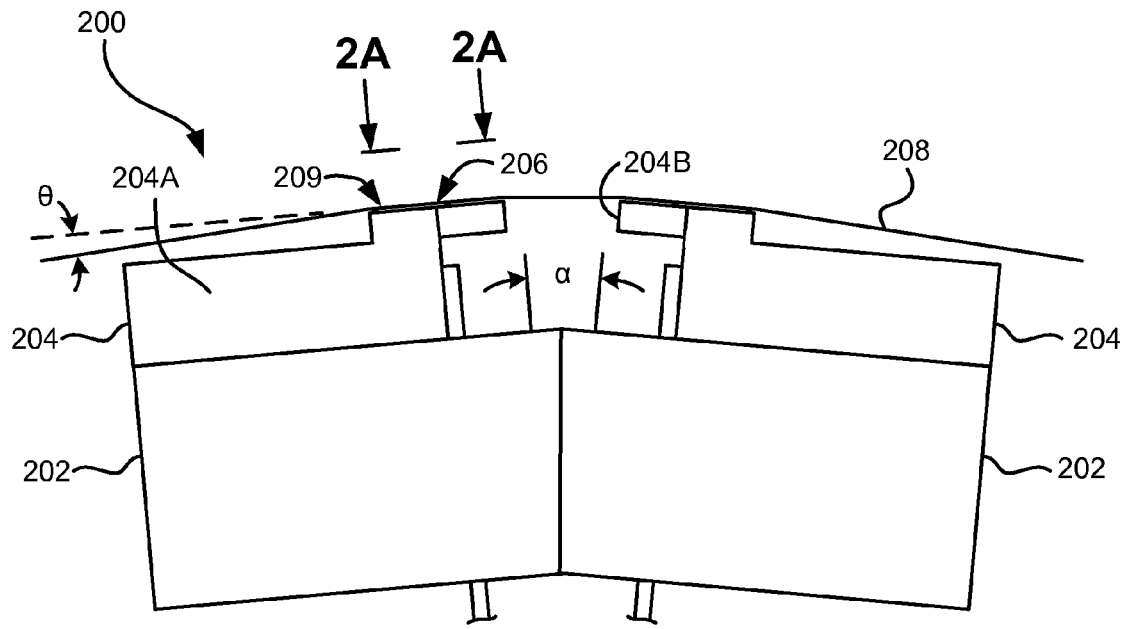
FIG. 2 is a block diagram of an exemplary embodiment illustrating a side view of a flat-lapped, bi-directional, two-module magnetic tape head in which aspects of the present invention may be realized.

By way of example, FIG. 2 is a block diagram of an exemplary embodiment 200 illustrating a side view of a flat-lapped, bi-directional, two-module magnetic tape head in which aspects of the present invention may be realized. As shown, the head includes a pair of bases 202, each equipped with a module 204, and fixed at a small angle a with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 5 degrees. The substrates 204A are typically constructed of a wear resistant material, such as a ceramic. The closures 204B made of the same or similar ceramic as the substrates 204A. The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
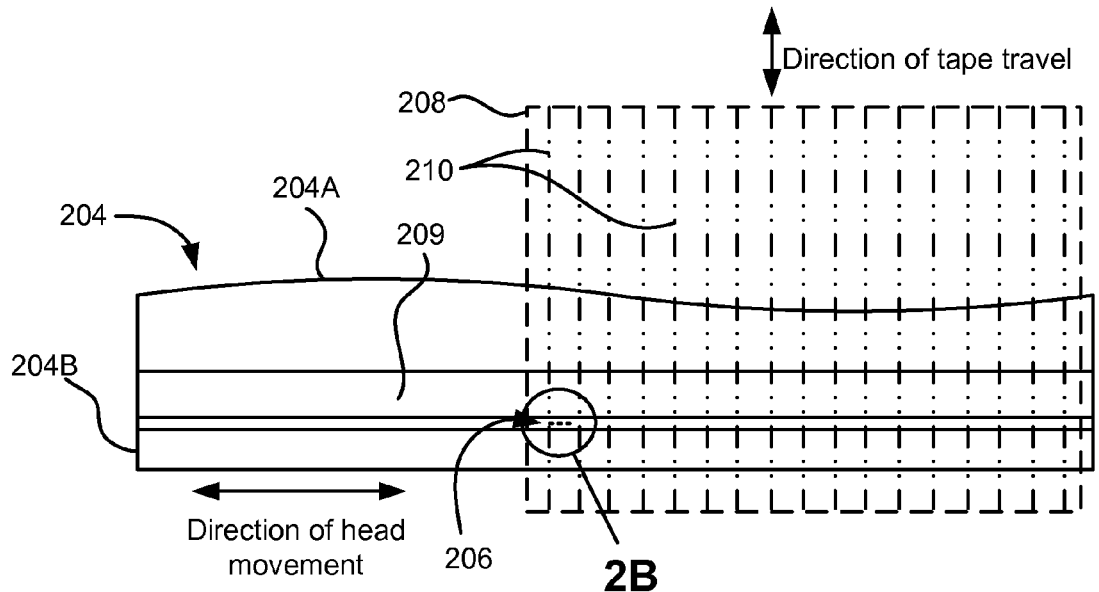
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands. In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 512 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
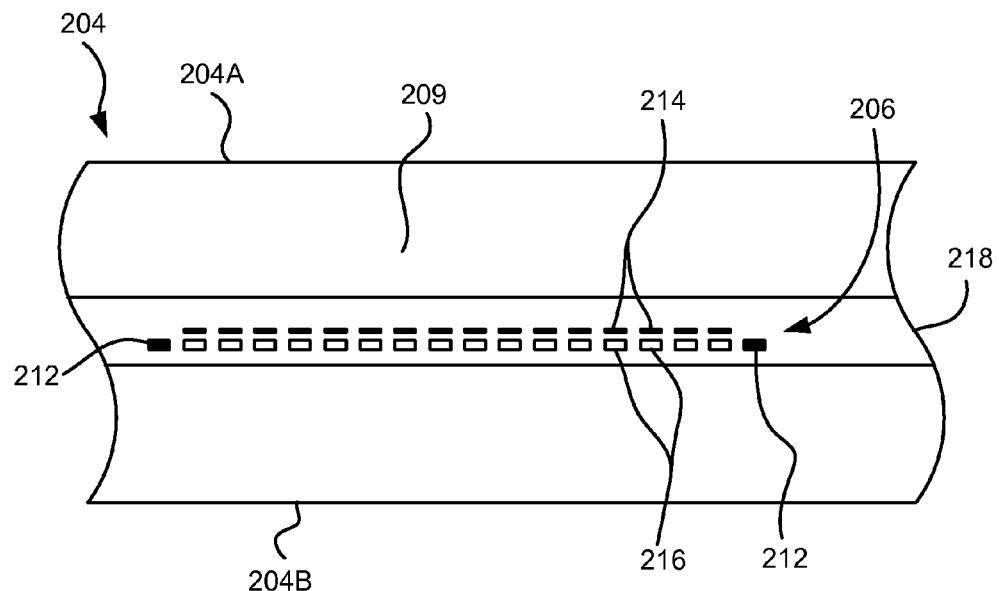
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 readers and/or writers 206 per array. A preferred embodiment includes 32 readers per array and/or 32 writers per array, where the actual number of transducing elements could be greater, e.g., 33, 34, etc. This allows the tape to travel more slowly, thereby reducing speed-induced tracking and mechanical difficulties and/or executing fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
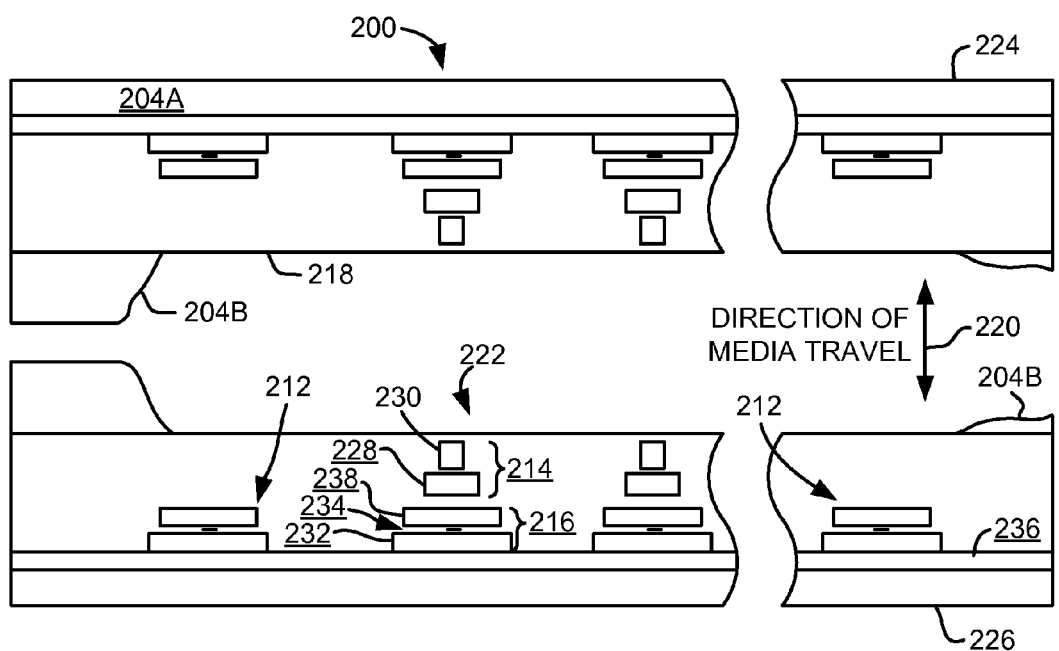
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium there across to form an R/W pair, exemplified by the R/W pair 222. Several R/W pairs 222 may be present, such as 8, 16, 32 pairs, etc. The R/W pairs 222 as shown are linearly aligned in a direction generally perpendicular to a direction of tape travel there across. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 402, 406 each include one or more arrays of writers 410. The inner module 404 of FIG. 3 includes one or more arrays of readers 408 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

The teachings herein may be applied to other types of data storage systems. For example, according to a general embodiment, a data storage system may include a head, which may be magnetic, optical, etc., or any other type of head that would be apparent to one skilled in the art upon reading the present description. The system may additionally include a drive mechanism for passing an e.g., magnetic, optical, etc. medium over the head. The data storage system may further include a controller electrically coupled to the head.

The data storage system may also include logic according to any of the embodiments described and/or suggested herein. In one approach, the logic may be encoded in a controller and/or other hardware, stored in memory as software or firmware and made available to the controller and/or other hardware, etc. and combinations thereof. Moreover, the logic may be for performing any of the process steps recited herein.

Moreover, conventional data storage systems include a predefined stopwrite threshold and can be inaccurate for any given period of writing. Depending on the situation, the stopwrite threshold can either be overly constraining by only permitting writing during a low PES, thereby minimizing the capacity of the tape; or it may be overly permissive by permitting writing during high PES samples, thus allowing adjacent tracks on the medium to be overwritten.

Embodiments of the present invention also overcome the aforementioned drawback by dynamically determining a maximum velocity during a tape drive operation to obtain a statistical standard deviation of a position error signal (PES) that yields an amount of stopwrite (SW) operations that avoids backhitching, and then adjusting the tape drive to the maximum velocity. Preferably, such system and/or method is able to statistically calculate the PES standard deviation (or other derivative of a PES sample) and make changes to the stopwrite threshold and/or dynamically determine the maximum tape velocity accordingly, as explained in further detail below.

In one embodiment, the maximum tape speed/tape velocity, which has the highest acceptable PES standard deviation, is dynamically determined for writing and reading to a tape. In one embodiment, the maximum tape speed/tape velocity is dynamically determined by recursively lowering the tape speed/tape velocity, until an appropriate PES standard deviation is found. In an alternative embodiment, the maximum tape speed/tape velocity is dynamically determined by assuming that there is a linear relationship between the tape speed and the standard deviation. With this assumption, only 2 speeds are measured and then a graphical line is used to find the linear mathematical relationship between the tape velocity/tape speed and the standard deviation. The linear relationship is then used to dynamically determine the maximum tape velocity/tape speed with a sufficiently low standard deviation. In an alternative embodiment, an exhaustive search may be performed on each and every individual tape speed/tape velocity. The standard distribution of each and every individual tape speed/tape velocity is then measured to dynamically determine the maximum tape velocity that has an acceptable PES standard deviation. If the maximum tape velocity has too high standard deviation of PES, then a lower speed is tried until the PES standard deviation is low enough for acceptable writing. The embodiments prevent and avoid backhitching and also maximize cartridge data capacity.

Figure 5:
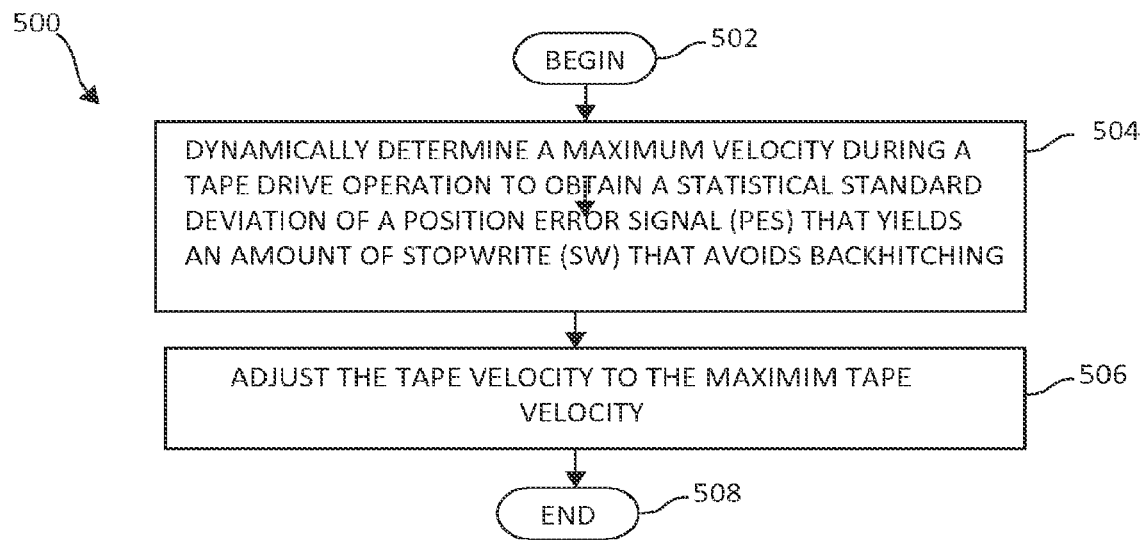
FIG. 5 is a flowchart illustrating an exemplary method for dynamically controlling tape velocity which aspects of the present invention may be realized.

FIG. 5 is a flowchart illustrating an exemplary method 500 for dynamically controlling tape velocity according to one embodiment. The method 500 begins by dynamically determining a maximum velocity during a tape drive operation to obtain a statistical standard deviation of a position error signal (PES) that yields an amount of stopwrite (SW) operations that avoids backhitching (step 504). The tape velocity is adjusted to the maximum tape velocity (step 506). The method ends (step 508).

Figure 6:
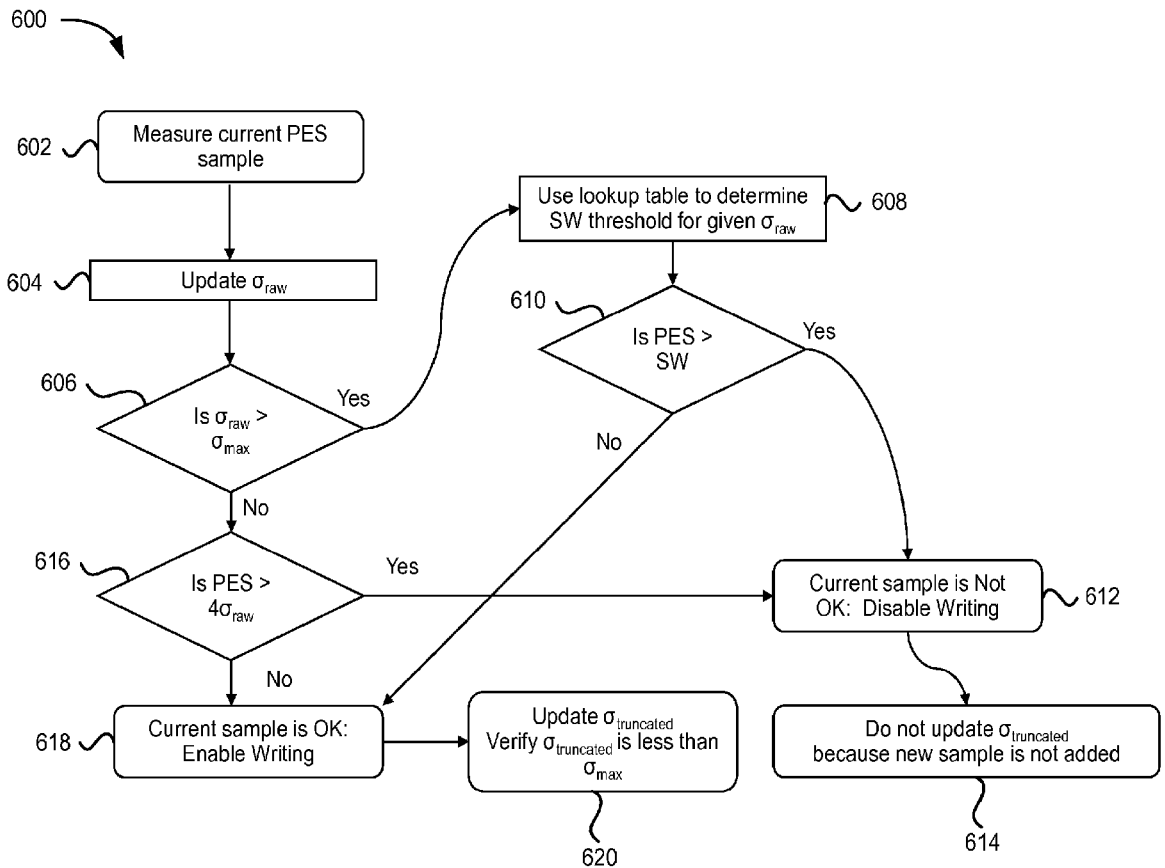
FIG. 6 is a flowchart illustrating an exemplary method for measuring a current PES sample which aspects of the present invention may be realized.

Referring now to FIG. 6, a flowchart illustrating an exemplary method 600 for measuring a current PES sample is depicted according to one illustrative embodiment. As an option, the present method 600 may be implemented in conjunction with features from any other embodiments listed herein, such as those described with reference to the other FIG.'s. Of course, however, such method 600 and others presented herein may be used in various applications and/or in permutations, which may or may not be specifically described in the illustrative embodiments listed herein. Further, the method 600 presented herein may be used in any desired environment. In a preferred approach, the method 600 may be executed at regular or irregular intervals as the track is being written to. Operation 602 includes measuring the current PES sample. In one approach, the previous PES samples may be measured to find the corresponding deviation. According to one approach, the PES may be measured by incorporating any method known in the art, e.g., using servos, etc. Operation 604 includes updating a first value (e.g., $\sigma_{raw}$), which may be based on PES samples, a current PES sample, etc. According to various approaches, $\sigma_{raw}$ may be a standard deviation of PES samples, including prior PES samples, the current PES sample, etc. Moreover, $\sigma_{raw}$ may be calculated by incorporating any formula known in the art.

In one illustrative embodiment, the $G_{raw}$ may be calculated using Equation 1, where $\sigma_k$ is used as $\sigma_{raw}$.

$$\sigma_k^2 = B \times \sigma_{k-1}^2 + (1-B) \times x_k^2 \quad (1)$$

According to the preferred embodiment, $\sigma_k^2$ represents the variance at the current PES sample, $\sigma_{k-1}^2$ represents the variance at the previous PES sample, and $x_k$ represents the current PES sample. By incorporating the variance of the previous PES samples, the accumulative distribution may be accurate, thereby preferably resulting in an accurate stopwrite threshold as well, without having to store all of the previous PES sample values.

In one approach, if equation (1) is incorporated for a first time, the value for $\sigma_{k-1}^2$ (variance of the previous PES sample) may implement stored data from the previous PES sample, an arbitrary value chosen by a user, etc. Without wishing to be bound by any theory, it is believed that the $\sigma_{k-1}^2$ value implemented for a first time Equation (1) is used, may not significantly affect the $\sigma_{raw}$ value that is calculated and used to set the SW threshold during writing.

Depending on the embodiment, the value of B may determine how much of an effect the previous PES sample has compared to the current PES sample, on the value of $\sigma_{raw}$ being calculated. Without wishing to be bound by any theory, it is believed that a value for B between about 0.99 and about 0.999 results in an optimal effect for most embodiments, but may be any value.

$\sigma_{raw}$ can be calculated by taking the square root of $\sigma_k^2$. With continued reference to FIG. 6, operation 606 includes determining whether the first value (e.g., $\sigma_{raw}$) exceeds a predetermined threshold (e.g., $\sigma_{max}$). According to various approaches, a predetermined threshold (e.g., $\sigma_{max}$) may be calculated using any method known in the art; however an illustrative example, which is in no way meant to limit the invention, is provided.

With continued reference to FIG. 6, operation 610 includes determining if the current PES sample is greater than the stopwrite threshold acquired in operation 608. In the case that the current PES sample is in fact greater than the stopwrite threshold, operation 612 of the method 600 disables writing.

In one embodiment, if writing is enabled or disabled during an interval, it is enabled or disabled only for the current interval. It is preferred that, at the start of each new interval, the logic may be run to determine if the writing should be enabled or disabled for that given interval. In another approach, if writing is enabled or disabled during an interval, it may remain enabled or disabled for at least one, at least two intervals, multiple, etc. intervals, regardless of the logic.

With continued reference to FIG. 6, operation 614 includes not updating a truncated value (e.g., $\sigma_{truncated}$). According to a preferred approach, the truncated value is not updated when writing is disabled. More information about $\sigma_{truncated}$ is provided below, including operations when $\sigma_{truncated}$ is updated. Referring back to operation 606, if it is determined that the first value (e.g., $\sigma_{raw}$) fails to exceed the predetermined threshold (e.g., $\sigma_{max}$), then a determination is made whether the current PES sample is greater than a second value (e.g., four times $\sigma_{raw}$). See operation 616.

According to various approaches, the second value may be calculated by incorporating any formula, preferably one that includes $\sigma_{raw}$. In a preferred approach, the second value may act as a stopwrite threshold although the $\sigma_{raw}$ value does not exceed the value of $\sigma_{max}$. Therefore, rather than having no stopwrite threshold, the writing operation may be protected against any sudden fluctuations in the current PES sample, which could later cause readback errors. The second value itself can be any value providing the aforementioned result. According to one illustrative example, calculating a second value may include, but is not limited to N×$\sigma_{raw}$, where N signifies a predetermined value such as 2, 3, 4, 5, etc.

With continued reference to FIG. 6, if it is determined that the current PES sample is greater than the second value (e.g., four times $\sigma_{raw}$), the method 600 precedes to operation 612 and 614 as described above. However, if it is determined that the current PES sample is not greater than the second value (e.g., four times $\sigma_{raw}$), the method 600 proceeds to operation 618 which enables writing.

Similarly, referring back to operation 610, if the current PES sample is determined to not be greater than the stopwrite threshold, then the method 600 proceeds to operation 618, thereby enabling writing as described above.

With continued reference to FIG. 6, once writing has been enabled in operation 618, the method 600 proceeds to update a truncated value (e.g., $\sigma_{truncated}$) and verify that the truncated value is less than $\sigma_{max}$. See operation 620. According to a preferred approach, a method may include updating a truncated value (e.g., $\sigma_{truncated}$) by incorporating the current PES sample when writing is enabled. In one approach, the truncated value may be a standard deviation or variance of PES samples.

In some approaches, the truncated value may be compared to the predetermined threshold (e.g., $\sigma_{max}$). If the truncated value maintains a value at, or below the predetermined threshold, then it may be expected that, when reading back the written data on the track, no errors will occur.

According to one approach, if the $\sigma_{raw}$ is greater than the $\sigma_{max}$, then the method of truncated normal distributions (e.g., $\sigma_{truncated}$) may be incorporated to determine the truncation value such that the correct number of samples may be eliminated, but the PES values written to tape have the same standard distribution of $\sigma_{max}$. Thus, the $G_{ra}$, of the data that may be written to the tape will preferably be less than the value $\sigma_{max}$. This may be accomplished by obtaining the correct truncation value from a formula, a look up table, a predetermined value, a chart, etc.

For example, if the $\sigma_{truncated}$ value for the data actually written to the aforementioned track remains less than $\sigma_{max}$, there should be no errors when reading back that same portion of the track. However, if the $\sigma_{truncated}$ value for the data being written to the aforementioned track rises above the $\sigma_{max}$ value, errors may be expected to occur when later reading the data written to that same segment of the track. According to one approach, such errors may be caused by not having enough of the intended data successfully written to the track; as suggested by the high deviation. Therefore, it may be desirable to perform some additional evaluations in the even that $\sigma_{truncated}$ is not less than $\sigma_{max}$.

The stopwrite values may be calculated for various possible $\sigma_{raw}$ values using a variance formula known in the art. These $\sigma_{raw}$ values (along the x-axis) and their corresponding stopwrite values (along the y-axis) may be stored in a plot for future use. As discussed above, the maximum desired $\sigma_{raw}$ value may preferably be 0.35 µm.

Figure 7:
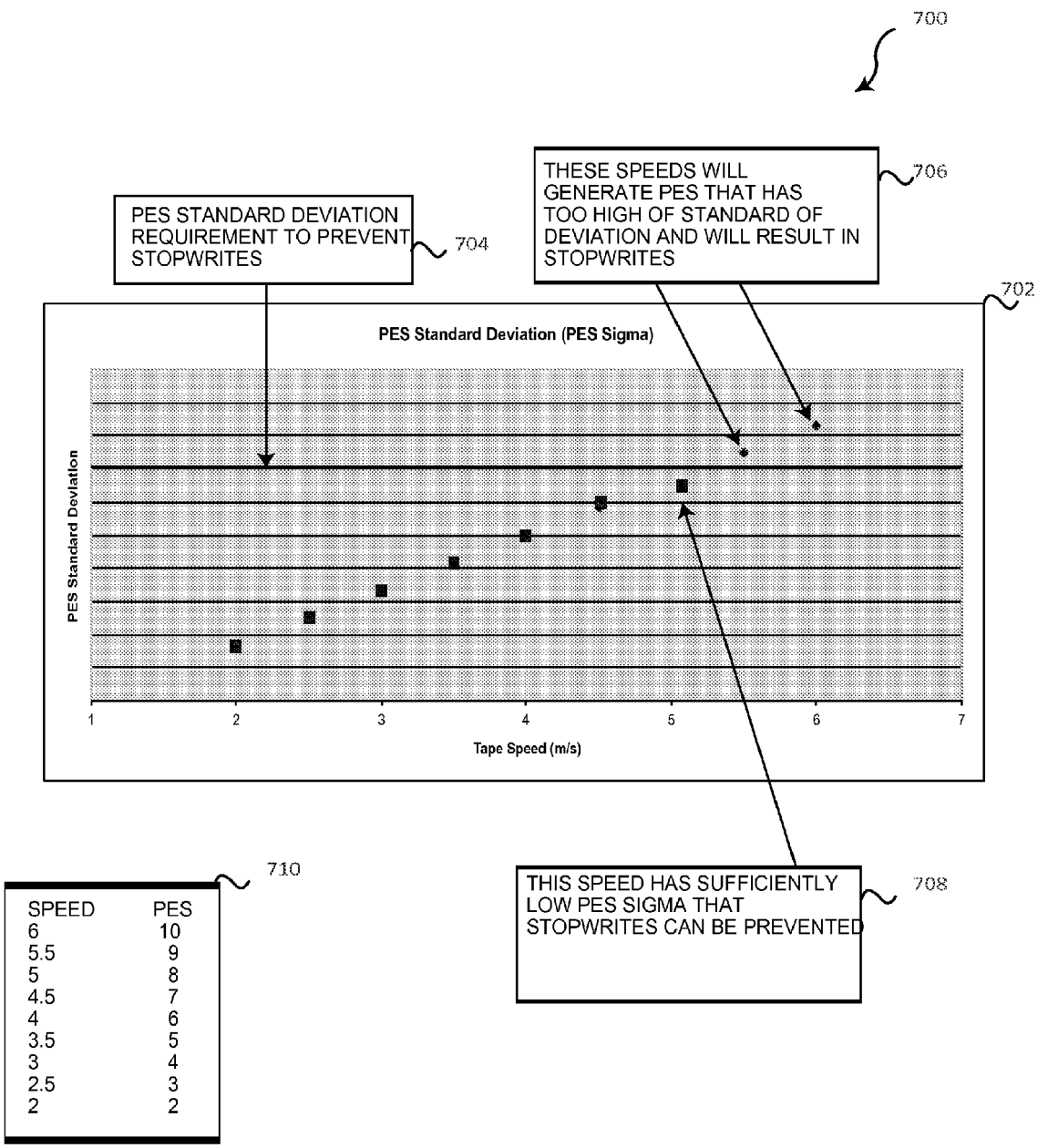
FIG. 7 is a graph illustrating exemplary results from dynamically determining the maximum tape velocity to obtain a statistical standard deviation of a position error signal (PES) that yields an amount of stopwrite (SW) operations which aspects of the present invention may be realized.

FIG. 7 is a graph illustrating the dynamically determining the maximum tape velocity to obtain a statistical standard deviation of a position error signal (PES) that yields an amount of stopwrite (SW) operations which aspects of the present invention may be realized. The vertical axis illustrates the PES standard deviation (PES sigma "σ") and has no units/values to simply illustrate an example that may incorporate a variety of units/values. As illustrated in FIG. 7, as the tape velocity/tape speed (illustrated in FIG. 7 as the diamond/square shape boxes with only one of them labeled for clarification as 702) increases, the PES sigma increases. The horizontal axis illustrates the tape speed/tape velocity measured in meters/second (m/s). By way of example only, the tape speeds/tape velocities start at 2 m/s and increment by 0.5 m/s and increase to 6 m/s. By way of example only, the PES starts at 2 and increment by a value of 1, and end at 10 PES. Thus, by way of example only, the graph illustrates a table 710 illustrating that for a tape speed of 2 m/s, the PES is measured at an arbitrary value of 2, for a tape speed of 2.5 m/s, the PES is measured at an arbitrary value of 3, for a tape speed of 3 m/s, the PES is measured at an arbitrary value of 4, for a tape speed of 3.5 m/s, the PES is measured at an arbitrary value of 5, for a tape speed of 4 m/s, the PES is measured at an arbitrary value of 6, for a tape speed of 4.5 m/s, the PES is measured at an arbitrary value of 7, for a tape speed of 5 m/s, the PES is measured at an arbitrary value of 8, for a tape speed of 5.5 m/s, the PES is measured at an arbitrary value of 9, and for a tape speed of 6 m/s, the PES is measured at an arbitrary value of 10.

It should be noted that there is a certain threshold where the PES sigma is so great that many stopwrites (SW) will occur. This is an undesirable condition, as capacity of the cartridge will be reduced, the media will be stressed due to the required backhitching operations, and the data rate will decrease as more time is spent performing the backhitching. Thus, the graph 700 of FIG. 7 illustrate that the maximum tape velocity is dynamically determined so as to perform a tape write operation at the fastest tape speed/tape velocity, detect that the PES sigma is too great, try an nth faster speed (e.g., 2nd faster speed/velocity) and still detect that the PES sigma is too great. Yet, when the nth speed is next applied/tried (e.g., 3rd faster speed/velocity), the PES sigma is sufficiently low that the SW are not expected, and the drive can operate at a condition that maximizes data rate, minimized the tape stress, and also minimizes the number of SW's. The PES standard deviation line (704) illustrates the PES standard deviation (PES sigma) requirement to prevent the stopwrites. Above this PES standard deviation 704 are tape velocities/tape speeds (706) that will generate PES that has too high of a standard deviation and will result in many stopwrites (e.g., the tape velocity at 5.5 and 6 m/s, which yields a PES of 9 and 10 respectively. However, just below this PES standard deviation 704 is a maximum tape velocity/tape speed 708 that has a sufficiently low PES sigma that the stopwrites can be prevented (e.g., the maximum tape velocity is determined to be the tape velocity at 5 m/s that yields a PES of 8).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for controlling tape velocity using a processor device, the method comprising:
   dynamically determining a maximum tape velocity during a tape drive operation to obtain a statistical standard deviation of a position error signal (PES) that yields an amount of stopwrite (SW) operations that avoids backhitching; and
   adjusting the tape velocity until the statistical standard deviation of the PES is calculated.

2. The method of claim 1, further including:
   adjusting a SW threshold,
   determining if a current PES sample is greater than the SW threshold,
   disabling a write operation if the current PES sample is greater than the SW threshold, and
   enabling the write operation if the current PES sample is not greater than the SW threshold.

3. The method of claim 1, wherein the dynamically determining the maximum tape velocity further includes calculating a linear relationship between the tape velocity and the statistical standard deviation by measuring a current PES sample of the tape drive operation to determine the linear relationship, and the adjusting the tape velocity further includes adjusting the tape velocity to the maximum tape velocity by recursively lowering the tape velocity until the statistical standard deviation of the PES is calculated that yields the amount of the SW operations that avoids backhitching.

4. The method of claim 1, further including, if the maximum tape velocity has the statistical standard deviation of the PES that produces the backhitching during the SW operations, lowering the tape velocity until the statistical standard deviation of the PES is calculated that yields the amount of the SW operations that avoids backhitching.

5. The method of claim 1, further including, if the tape velocity has the statistical standard deviation of the PES that produces the backhitching during the SW operations, increasing the tape velocity until dynamically determining the maximum tape velocity.

6. The method of claim 1, wherein the dynamically determining the maximum tape velocity occurs only during a tape drive write operation.

7. The method of claim 1, further including operating a tape drive at the maximum tape velocity that performs one of maximizing a data rate, minimizes stress on a tape drive, and minimizes the SW operations.

8. A system for controlling tape velocity a tape drive, the system comprising:
   a tape head,
   the tape drive, in communication with the tape head, and
   a processor device, controlling the tape head and the tape drive, wherein the processor device:
      dynamically determines a maximum tape velocity during a tape drive operation to obtain a statistical standard deviation of a position error signal (PES) that yields an amount of stopwrite (SW) operations that avoids backhitching, and
      adjusts the tape velocity until the statistical standard deviation of the PES is calculated.

9. The system of claim 8, wherein the processor device:
   adjusts a SW threshold,
   determines if a current PES sample is greater than the SW threshold,
   disables a write operation if the current PES sample is greater than the SW threshold, and
   enables the write operation if the current PES sample is not greater than the SW threshold.

10. The system of claim 8, wherein the processor device calculates a linear relationship between the tape velocity and the statistical standard deviation by measuring a current PES sample of the tape drive operation to determine the linear relationship.

11. The system of claim 8, wherein the processor device, if the maximum tape velocity has the statistical standard deviation of the PES that produces the backhitching during the SW operations, lowers the tape velocity until the statistical standard deviation of the PES is calculated that yields the amount of the SW operations that avoids backhitching.

12. The system of claim 8, wherein the processor device, if the tape velocity has the statistical standard deviation of the PES that produces the backhitching during the SW operations, increase the tape velocity until dynamically determining the maximum tape velocity.

13. The system of claim 8, wherein the dynamically determining the maximum tape velocity occurs only during a tape drive write operation.

14. The system of claim 9, wherein the processor device operates the tape drive at the maximum tape velocity that performs one of maximizing a data rate, minimizes stress on a tape drive, and minimizes the SW operations, and the processor device adjusts the tape velocity by adjusting the tape velocity to the maximum tape velocity by recursively lowering the tape velocity until the statistical standard deviation of the PES is calculated that yields the amount of the SW operations that avoids backhitching.

15. A computer program product for controlling tape velocity by a processor device, the computer program product comprising a non-transitory computer-readable storage medium having computer-readable program code portions stored therein, the computer-readable program code portions comprising:
   a first executable portion that dynamically determines a maximum tape velocity during a tape drive operation to obtain a statistical standard deviation of a position error signal (PES) that yields an amount of stopwrite (SW) operations that avoids backhitching; and
   a second executable portion that adjusts the tape velocity until the statistical standard deviation of the PES is calculated.

16. The computer program product of claim 15, further including a third executable portion that:
   adjusts a SW threshold,
   determines if a current PES sample is greater than the SW threshold,
   disables a write operation if the current PES sample is greater than the SW threshold, and
   enables the write operation if the current PES sample is not greater than the SW threshold.

17. The computer program product of claim 15, further including a third executable portion that calculates a linear relationship between the tape velocity and the statistical standard deviation by measuring a current PES sample of the tape drive operation to determine the linear relationship, wherein adjusting the tape velocity further includes adjusting the tape velocity to the maximum tape velocity by recursively lowering the tape velocity until the statistical standard deviation of the PES is calculated that yields the amount of the SW operations that avoids backhitching.

18. The computer program product of claim 15, further including a third executable portion that, if the maximum tape velocity has the statistical standard deviation of the PES that produces the backhitching during the SW operations, lowers the tape velocity until the statistical standard deviation of the PES is calculated that yields the amount of the SW operations that avoids backhitching.

19. The computer program product of claim 15, further including a third executable portion that, if the tape velocity has the statistical standard deviation of the PES that produces the backhitching during the SW operations, increase the tape velocity until dynamically determining the maximum tape velocity.

20. The computer program product of claim 15, wherein the dynamically determining the maximum tape velocity occurs only during a tape drive write operation.

21. The computer program product of claim 15, further including a third executable portion that operates a tape drive at the maximum tape velocity that performs one of maximizing a data rate, minimizes stress on a tape drive, and minimizes the SW operations.

* * * * *